United States Patent [19]
Pitt et al.

[11] Patent Number: 4,696,543
[45] Date of Patent: Sep. 29, 1987

[54] OPTICAL FIBER CABLE HAVING A LOW PERMEABILITY TO HYDROGEN

[75] Inventors: Gilles D. Pitt, Saffron Walden; Philip Extance, Cambridge; Roger E. Jones, Little Shelford, all of United Kingdom

[73] Assignee: Standard Telephone and Cables, Plc, London, England

[21] Appl. No.: 729,180

[22] Filed: May 1, 1985

[30] Foreign Application Priority Data

May 22, 1984 [GB] United Kingdom ............... 8413241

[51] Int. Cl.⁴ .............................................. G02B 6/44
[52] U.S. Cl. .............................. 350/96.23; 350/96.34
[58] Field of Search ....................... 350/96.23, 96.34

[56] References Cited

U.S. PATENT DOCUMENTS

| 4,173,393 | 11/1979 | Maurer | 350/96.34 |
| 4,355,865 | 10/1982 | Conrad et al. | 350/96.23 |
| 4,525,026 | 6/1985 | Elion | 350/96.23 |

FOREIGN PATENT DOCUMENTS

| 0036892 | 10/1981 | European Pat. Off. | |
| 0099515 | 2/1984 | European Pat. Off. | |
| 0104380 | 4/1984 | European Pat. Off. | |
| 2389147 | 11/1978 | France | |
| 2410833 | 6/1979 | France | 350/96.23 |
| 2489002 | 2/1982 | France | 350/96.23 |
| 2550863 | 2/1985 | France | 350/96.23 |
| 1519935 | 8/1978 | United Kingdom | |
| 2128358 | 4/1984 | United Kingdom | 350/96.23 |
| 2144878 | 3/1985 | United Kingdom | 350/96.23 |

OTHER PUBLICATIONS

IEEE Transactions on Magnetics, vol. MAG 12, No. 6, Nov. 1976, pp. 924–926, IEEE, New York, U.S., L. I. Mendelsohn et al., "Glassy Metal Fabric: A Unique Magnetic Shield".
Mikrowellen Magazin, vol. 8, No. 2, 1982, pp. 210–213, DE: "Magnetische Kabelabschirmung mit amorphen Metallen".
Chemical Abstracts, vol. 92, No. 22, Jun. 2nd, 1980, p. 213, No. 184611d, Columbus, Ohio, U.S.; S. Takayama et al., "Composite Metallic Glass Wires".
J. Appl. Phys., vol. 53, No. 2, Feb. 1982, pp. 970–978, American Institute of Physics, New York, U.S., D. J. Mitchell et al., "Deuterium Permeation Through Copper with Trapping Impurities".
IEEE Journal on Selected Areas in Communications, vol. SAC-2, No. 6, Nov. 1984, pp. 842–847, IEEE, New York, U.S., K. Mochizuki et al., "Influence of Hydrogen on Optical Fiber Loss in Submarine Cables".
Laser Focus, vol. 17, No. 11, Nov. 1981, p. 122, Newton, Mass., U.S. "Miniature Transoceanic Optical Cable Design".

Primary Examiner—William L. Sikes
Assistant Examiner—Frank González
Attorney, Agent, or Firm—Dennis P. Clarke

[57] ABSTRACT

Amorphous metallic material in ribbon form is employed to provide hermeticity of cable elements, particularly optical fibres. The metallic glass CuZr has a low permeability for hydrogen, particularly when erbium is included. Thus sealing optical fibres (1) in amorphous metal tubes (3) will prevent increase in attenuation of such fibres when used in submarine cables by preventing contact with hydrogen generated in such cables during use thereof.

12 Claims, 4 Drawing Figures

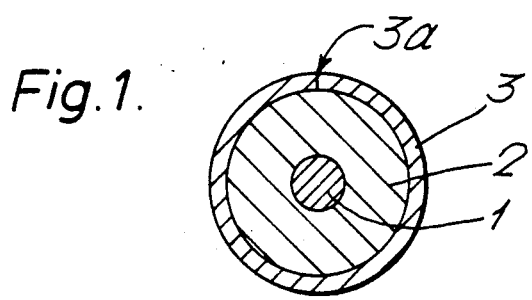
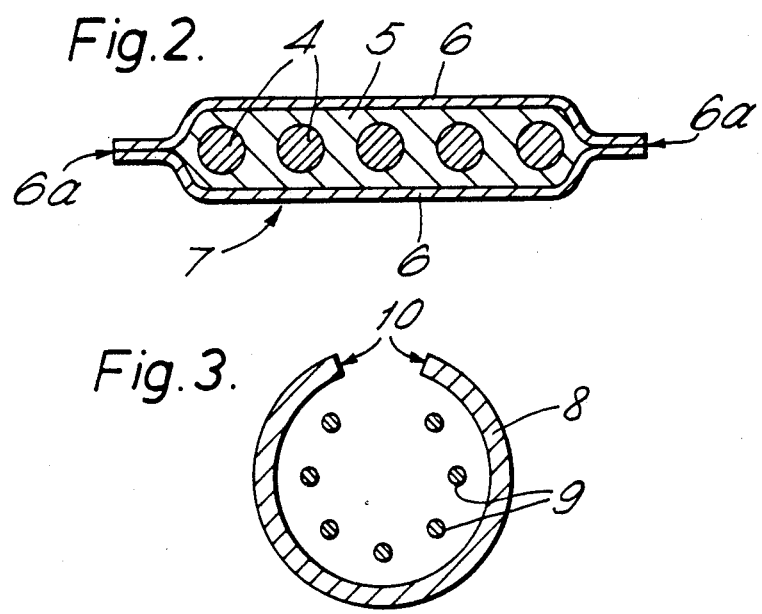
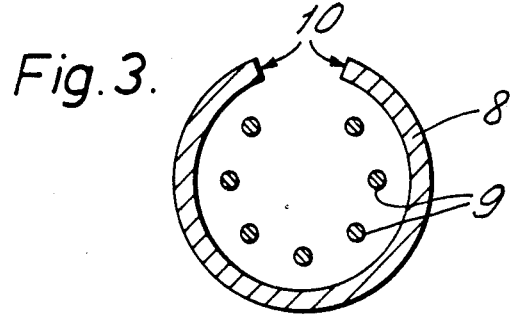
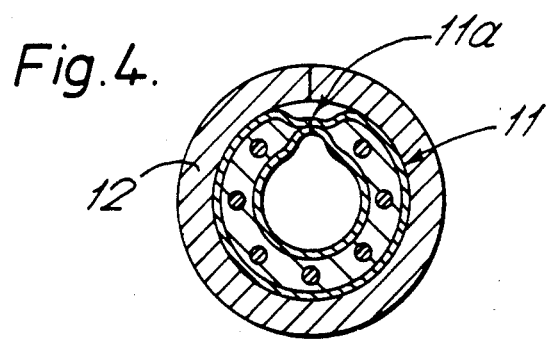

OPTICAL FIBER CABLE HAVING A LOW PERMEABILITY TO HYDROGEN

BACKGROUND OF THE INVENTION

This invention relates to cables and in particular, but not exclusively, to telecommunications cables, which may or may not incorporate optical fibres, and methods of manufacturing them.

During use of submarine telecommunications cables hydrogen gas has been found to accumulate in the cable core. This has proved to be the case for both conventional coaxial metallic conductor cables and for optical fibre cables. The existence of free hydrogen in silica optical fibre cables is particularly undesirable since if such hydrogen can permeate into the silica of the fibres their attenuation is greatly increased, and cable performance is adversely affected, this being particularly relevant to the 1.3 and 1.55 micrometer systems.

The mechanism serving to produce the hydrogen in submarine cables is presently not fully understood and thus the present invention has, in part, proceeded from the need to prevent any hydrogen so generated reaching and adversely affecting optical fibre cores, rather than the more fundamental problem of preventing the generation of the hydrogen in the first place. The problem possibly stems from permeation of sea water into the cable construction, aided by the high pressure pertaining on the sea bed, despite the cable construction being formed is a supposedly hermetically sealed manner. Once present inside the cable the water serves to permit the build up of an electrical voltage between metallic elements therein, such as steel reinforcing wires and an aluminum tube surrounding the fibres, and this voltage serves to generate hydrogen from the sea water. (K. Mochizuki et al "Transmission loss increase in optical fibres due to hydrogen permeation" Electronics Letters 1st September 1983 Vol 18 No 18 pp 743-5).

SUMMARY OF THE INVENTION

According to one aspect of the present invention there is provided a cable incorporating an amorphous metallic material.

According to another aspect of the present invention there is provided a cable including amorphous metal strip comprised as a protective layer for a cable element.

BRIEF DESCRIPTION OF THE DRAWINGS

Embodiments of the invention will now be described with reference to the accompanying drawings, which are not drawn on the same scale, in which:

FIG. 1 illustrates a cross-section through an hermetic optical fibre construction;

FIG. 2 illustrates a cross-section through a composite optical fibre strip construction;

FIG. 3 illustrates a cross-section through a cable element including a plurality of optical fibres prior to closure of a sheath disposed therearound, and FIG. 4 illustrates a cable construction incorporating a fibre strip of FIG. 2 and a protective sheath.

DESCRIPTION OF THE PREFERRED EMBODIMENTS

In order to prevent the possibility of hydrogen reaching the silica of the optical fibre core it is ideally required that the fibre be disposed within a body which is impermeable to hydrogen. Most materials are permeable to hydrogen to a greater or lesser extent. Optical fibres may be conventionally hermetically sealed in metallic tubes for example of copper or aluminum, however it can be shown that neither of these as pure metals provide an effective barrier for hydrogen over a 25 year life span of a cable. Whereas it is calculated that aluminum oxide or beryllium oxide could provide a barrier to hydrogen over a 25 year life span, in practice use in cables is not considered practicable since additional mechanical and environmental protection would be required.

It has been shown (D.J. Mitchell et al J. App. Phys. 53, 970, (1982)) that the diffusion constant of hydrogen in a metal may be greatly reduced in dilute alloys as a result of trapping the hydrogen therein. In particular dilute copper alloys, containing zirconium or titanium, or the rare earth element erbium, are particularly effective for trapping hydrogen for periods in excess of a projected 25 year cable life span.

Amorphous metals can be made in strip form by rapidly quenching molten alloys on a rapidly spinning cooled wheel. This process produces a ribbon or strip typically 40 micrometres thick and of width typically 1 cm or greater. Such materials offer high strength, flexibility, high yield strength and forming and bonding properties.

Amorphous metals which can be manufactured include metallic glass types such as the metallic glass brazing alloys, for example CuZr, which alloy as mentioned above is effective for trapping hydrogen. We thus propose to use such metallic glass ribbon/strip in cable manufacture in such a manner as to protect elements which are adversely affected by the presence of hydrogen, for example silica optical fibres. One such use is illustrated in FIG. 1. An optical fibre core 1 is provided with a conventional primary coatings/buffer layer 2. An amorphous metal ribbon 3 is longitudinally applied to the primary coated fibre and the longitudinal edges of the ribbon sealed together at 3a. Several of the metallic glass alloys, for example CuZr, can be brazed and we have successfully achieved spot welding, thus sealing with good diffusion bonds is readily attainable. Alternatively, other copper amorphous alloys which inhibit the passage of hydrogen may be employed for the above and other cable applications, see below for example. Such alloys include CuTi and CuHf. The hydrogen trapping properties of these amorphous alloys may be improved by the incorporation of rare earth elements, for example erbium as mentioned above. Such a composition may comprise 70% Cu, 29% Zr and 1% Er. The percentage of the rare earth could be considerably smaller than 1%. Large proportions of erbium, for example, would not be economic.

An alternative optical element structure is illustrated in FIG. 2. It comprises five optical fibres 4 each of which is provided with primary coating material 5. The primary coating material is, however, common to all fibres and is in strip form. Such an arrangement may be achieved by drawing the optical fibres simultaneously and passing them in a parallel manner through a suitable coating apparatus. A respective amorphous metal ribbon 6 is disposed on each side of the fibre/coating material strip element to sandwich it therebetween and the adjacent longitudinal edges of the ribbons 6 sealed together at 6a by welding or brazing. Thus there is provided a composite optical fibre strip 7. Whereas the illustrated version of strip 7 includes five optical fibres other numbers thereof (two or more) may be employed. Such a composite optical fibre strip 7 may be would helically around a central string. The high strength and high yield strength of the metallic glasses is such that an optical fibre provided with a layer thereof as in FIGS. 1 or 2 may not require the use of additional strength members. Typically the yield strength of such metallic glasses is of the order of 1500–2000 Newtons per sqr mm, and Youngs Modulus is of the order of 150 kilo Newtons per sqr mm.

Other possible uses of the amorphous metal in cables are illustrated in FIGS. 3 and 4. In FIG. 3 there is indicated an amorphous metal C-shaped section 8 into which a number of secondary coated optical fibres 9 are introduced prior to closing of the edges 10 of the C together and sealing them together. The interstital spaces in the closed C-shaped section may be filled with, for example, conventional water blocking gels as appropriate. In FIG. 4 there is illustrated a composite optical fibre strip 11, manufactured as described with respect to FIG. 2 for strip 7, which has been formed into a cylindrical shape, its edges joined at 11a, and surrounded by a conventional protective tube 12 formed from a copper or aluminum C-shaped section. A strength member (not shown) may be disposed in the cavity formed in the cylindrical optical fibre member. Several layers of the amorphous metal ribbon may be used if increased thickness is required. The amorphous metal ribbons will generally be manufactured in finite lengths and wound onto reels whereas extremely long continuous lengths of optical fibre, very much longer than the ribbon wound on a reel, may be drawn from a single preform. However, continuous sheathing of optical fibres is possible with the amorphous metal ribbon since welding between reels can be achieved using standard techniques. The metallic glass ribbon has a high electrical conductivity and can thus be employed to transmit power if required, although the resistivity is approximately ten times that of copper metal.

The amorphous nature of the surface of the ribbon permits deposition of surface materials such as silicon nitride or activated carbon which are uniformally spread, leaving no pin holes, because of the smoothness of the surface. Such coatings may be employed to provide increased hermeticity.

Whereas the invention has been specifically described with respect to the application of amorphous metal strips in optical fibre cable manufacture for the prevention of hydrogen permeation it is not to be considered as so limited. Such amorphous metal strips may be employed in any cable construction where it is desired to prevent contact betwen a cable element and hydrogen, where it is desired to provide improved hermeticity, or where the flexibility of the strips will facilitate cable processing.

The use of amorphous metal strips in cables thus can result, in dependence on the manner in which it is employed, in the technical advantages of preventing contact between a cable element and hydrogen, or improved hermeticity, or facilitating processing.

We claim:

1. A cable including an optical fibre which is hermetically sealed within a member formed from one or more ribbons comprised of a metallic glass serving to prevent exposure of the optical fibre to hydrogen gas present in the cable.

2. A cable as claimed in claim 1 wherein the metallic glass member comprises a layer which has been formed by applying one ribbon of the metallic glass longitudinally to the optical fibre and sealing the longitudinal edges of the ribbon together.

3. A cable as claimed in claim 1 and comprising a composite optical fibre strip including two or more optical fibres arranged in a strip of primary coating material and a respective ribbon of the metallic glass being disposed on each side of the strip of primary coating material such that the optical fibres are sandwiched therebetween, adjacent longitudinal edges of the ribbons being sealed together.

4. A cable as claimed in claim 3 and wherein the composite optical fibre strip is wound helically around a central string.

5. A cable as claimed in claim 3 wherein the composite optical fibre strip is formed into a cylindrical shape with its longitudinal edges joined together and wherein a protective tube is provided over the cylindrically shaped strip.

6. A cable as claimed in claim 5 wherein the protective tube is formed from a copper or aluminum C-shaped section.

7. A cable as claimed in claim 1 wherein the metallic glass member comprises a closed C-section, a number of optical fibres having been disposed in the C-shaped section which was formed from one said ribbon prior to closing together the edges of the C-shaped section and sealing the edges together.

8. A cable as claimed in claim 1 wherein the metallic glass is a metallic glass brazing alloy.

9. A cable as claimed in claim 1 wherein the metallic glass is selected from the group consisting of CuZr, CuTi and CuHf.

10. A cable as claimed in claim 9 wherein the metallic glass further includes erbium.

11. A cable as claimed in claim 1 and wherein the metallic glass is comprised of 70% Cu, 29% Zr and 1% Er.

12. A cable as claimed in claim 1 wherein the metallic glass is provided with a surface coating selected from the group consisting of silicon nitride and activated carbon.

* * * * *